Dec. 14, 1971     E. W. SPRINGER     3,626,748
AUTOMATIC ALTITUDE REPORTING SYSTEM VERIFYING APPARATUS
Filed May 14, 1970     3 Sheets-Sheet 1
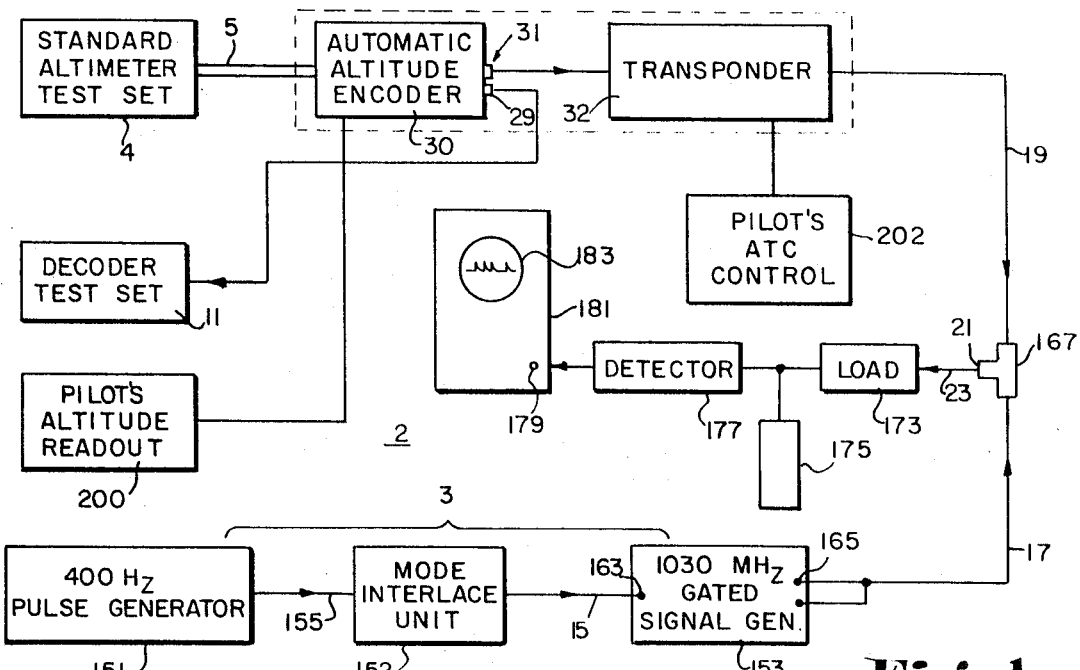
Fig. 1
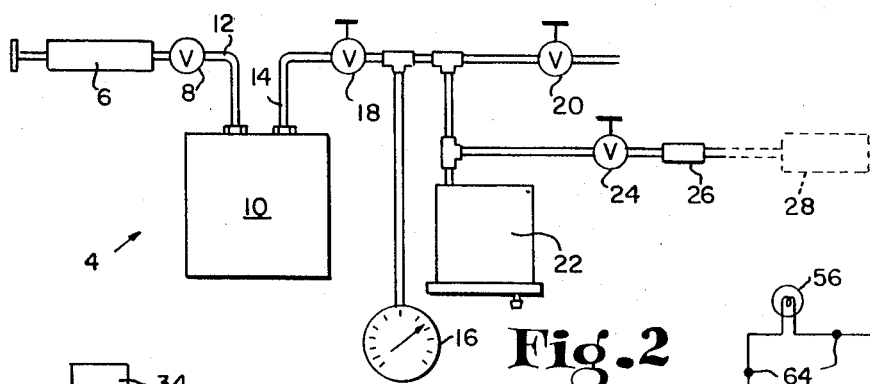
Fig. 2
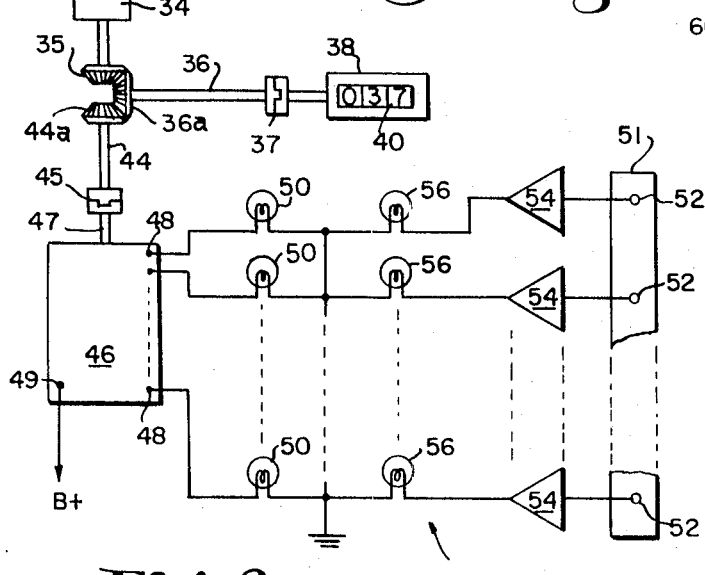
Fig. 3
Fig. 4
INVENTOR
EARL W. SPRINGER
BY
Hood, Gust, Irish & Lundy
ATTORNEYS Dec. 14, 1971   E. W. SPRINGER   3,626,748
AUTOMATIC ALTITUDE REPORTING SYSTEM VERIFYING APPARATUS
Filed May 14, 1970                                3 Sheets-Sheet 2

INVENTOR
EARL W. SPRINGER
BY
Hood, Gust, Irish & Lundy
ATTORNEYS

INVENTOR
EARL W. SPRINGER
BY
Hood, Gust, Irish & Lundy
ATTORNEYS

United States Patent Office 3,626,748
Patented Dec. 14, 1971

3,626,748
AUTOMATIC ALTITUDE REPORTING SYSTEM VERIFYING APPARATUS
Earl W. Springer, Box 220, Fairland, Ind. 46126
Filed May 14, 1970, Ser. No. 37,168
Int. Cl. G01l 22/00
U.S. Cl. 73—4 R
23 Claims

ABSTRACT OF THE DISCLOSURE

An apparatus for verifying the output of an aircraft transponder combined with an automatic altitude encoding means, the apparatus comprising an altimeter test set including means for generating negative pressures, a calibrated altimeter for measuring said pressure in units of altitude, means for applying these pressures to the altitude encoding means, an altitude decoder test set including encoder means for generating a binary reference signal corresponding to the altitude equivalent of the pressure applied to the said altitude encoding means and means for simultaneously displaying, for comparison, said binary reference signal and the binary signal from said altitude encoding means, and means for interrogating such a transponder including means for generating a transponder interrogating signal and means for displaying the signal generated by the transponder in response to said interrogating signal, whereby the signal generated by the transponder can be compared to said binary reference signal.

FIELD OF THE INVENTION

This invention relates generally to systems for testing the operation of cooperating air traffic control (ATC) transponder systems and automatic altitude encoders. Such altitude encoders are often called altitude digitizers. Transponder systems conventionally comprise a radio frequency transmitter-receiver which transmits a coded pulse train from the aircraft to a ground based receiver in response to a coded interrogation signal received by the transponder from a ground based transmitter. The transponder is capable of operating in three modes designated as modes A, B and C, respectively. In mode A, the transponder will transmit a time based pulse train having twelve pulse positions, each pulse position corresponding to a binary bit of a coded signal which identifies the particular aircraft. In mode C the transponder transmits a similar pulse train in which the signal corresponds to the aircraft's altitude, provided binary signals corresponding to the altitude are being fed to the transponder. The transponder may also operate in a combined mode, wherein the transponder alternately transmits the identification and the altitude code. In each instance, the code conforms to that adopted by the International Civil Aviation Organization (ICAO) International Agreements. I refer to my copending application Ser. No. 739,406, filed June 24, 1968, now U.S. Pat. 3,513,708, which discloses my preferred altitude encoder for generating pulse trains corresponding to the altitude at which a plane is flying.

SUMMARY OF THE INVENTION

The apparatus of my present invention includes a standard altimeter test set which is provided with a vacuum tank and a manually operated vacuum pump for generating negative pressures within the vacuum tank, the range of pressures generated corresponding to the range of atmospheric pressures encountered by an aircraft operating over an altitude range of minus 100 feet to plus 50,000 feet. Also included within the altimeter test set is a calibrated standard altimeter which measures the pressure in units of altitude. A flexible pneumatic line is used to apply the pressure from the altimeter test set to the pressure sensing means included within the automatic altitude encoder connected to the transponder. An altitude decoder test set is connected to the output of the automatic altitude encoder to be in parallel with the transponder, the test set including a mechanical decimal counter, a disc encoder (shaft encoder) operatively coupled to the decimal counter to operate in synchronism therewith, and a set of serially arranged indicator lights electrically connected to the disc encoder for rendering a visual indication of the state of each binary bit of the coded signal generated by the disc encoder. The disc encoder in the decoder test set is constructed to provide pulse trains conforming to the ICAO agreement for each selected test altitude reference. Also included within the test set is a plurality of electronic amplifiers connected to the output of the automatic altitude encoder, each of the amplifiers being provided to receive and amplify a predetermined one of the binary bits of the coded signal being generated within the automatic altitude encoder. Each of these amplifiers, in turn, drives one of a second group of serially arranged indicator lights, providing a visual indication of the coded signal from the automatic altitude encoder. The decimal counter and the disc encoder within the decoder test set are coupled together such that when the mechanical decimal counter indicates the decimal value of the altitude indicated on the standard calibrated altimeter within the altimeter test set, the disc encoder simultaneously generates the ICAO code equivalent of that altitude. By comparing the two groups of serially arranged indicator lights on the decoder test set, an operator can verify the accuracy of the signal from the automatic altitude encoder.

I provide a transponder interrogation signal generator which includes a high frequency signal generator for generating a 1030 megahertz signal, this signal generator including means for modulating the 1030 megahertz signal in response to an externally generated modulating signal. To provide a modulating signal, a conventional pulse generator is used to generate a repeating pulse and what I refer to as a mode interlace test set is coupled to the pulse generator to receive the repeating pulse. The mode interlace test set, in turn, generates a plurality of time based modulating pulses conforming to ICAO standards for a transponder interrogation signal envelope. The modulating pulses are applied to the modulating means in the high frequency signal generator, thereby producing the desired transponder interrogation signal.

The interrogation signal is applied to the input circuit of the transponder through coaxial cables and a two-way coupler. The transponder reply signal is transmitted from the transponder to an externally synchronized oscilloscope through coaxial cables and the aforementioned two-way coupler. The value of the transponder transmitted signal can be evaluated by observing the pulse train on the oscilloscope screen.

It is an object of my invention to provide an improved system for testing automatic altitude encoders.

It is another object of my invention to provide such a system which includes means for simultaneously displaying an automatic altitude encoder signal and a similar coded signal of known value for easy comparison.

It is yet another object of my invention to provide an altitude decoder test set which is simple in construction and reliable in operation, which test set can be used to verify the output of an automatic altitude encoder and the transponder connected to the encoder.

It is still another object of my invention to provide an apparatus for generating air traffic control transponder interrogation signals.

It is another object of my invention to provide a device for generating a transponder interrogation signal capable of exercising a transponder in its standard operating modes "A," "C," and combined "A" "C."

It is still another object of my invention to provide a test system which will produce a visual indication of the transponder response signals corresponding to altitude settings for comparison with known standard signals corresponding, respectively, to such settings.

It is yet another object of my invention to provide a test system for transponders and automatic altitude encoders, which test system is easy to operate and economical to produce.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a block diagram of the test system of this invention;

FIG. 2 is a schematic diagram of the standard altimeter test set;

FIG. 3 is a block diagram of the decoder test set;

FIG. 4 is a schematic diagram of one of the electronic amplifiers within the decoder test set;

DESCRIPTION OF THE PREFERRED EMBODIMENT

Figure 6:
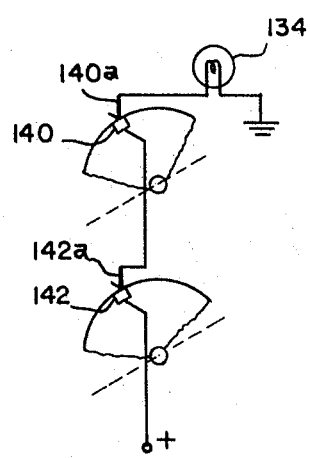
FIG. 6 is a schematic of the zero altitude indicating feature for the decoder test set.

Referring to FIG. 1, there will be seen a block diagram of the present invention indicated generally by the numeral 2, comprising a standard altimeter test set 4 such as manufactured and sold by Barfield Instrument Corp. of Miami, Fla. Shown schematically in FIG. 2, the altimeter test set 4 includes a manually-operated vacuum pump 6 fitted to a conventional one-way pneumatic valve 8, and a vacuum tank 10 connected to the vacuum pump 6 by conduit 12. The vacuum tank 10 is provided with an outlet opening 14 to which are connected a pressure gauge 16, manual valves 18 and 20, a standard altimeter 22, which has been calibrated and certified as a reference standard, a manual shut-off valve 24, and an outlet connection 26. With valve 18 closed, the vacuum pump 6 can be operated to generate a negative pressure within the vacuum tank 10, the pressure within the tank being indicated on the pressure gauge 16. The negative pressure available at the outlet port 26 can be regulated by selectively momentarily opening manual values 18 or 20. The pressure at outlet port 26 is indicated in units of altitude on the calibrated altimeter 22. The negative pressure can be applied to an external altitude measuring device 28 through manual shut-off valve 24. As will be discussed hereinafter, device 28 may be the altitude sensing means of an automatic altitude encoder 30. If it is desired to increase the pressure to the external altitude measuring device, valve 18 can be kept closed and valve 20 momentarily opened. Manual valve 24 further functions as a shut-off valve for altimeter test set 4 enabling negative pressures to be maintained when the device 28 is removed.

An automatic altitude encoder 30 is connected to the altimeter test set 4 with a flexible pneumatic tube 5. The altitude encoder 30 can be any conventional altitude encoding system which is designed to be mounted within an aircraft and which is capable of sensing atmospheric pressures outside the aircraft and automatically producing a binary coded digital signal corresponding to the pressure altitude. For an example of such an automatic altitude encoder, see my aforesaid copending application Ser. No. 739,406, filed June 24, 1968. The pressure altitude encoder 30 includes a pressure sensing device 28 for measuring the atmospheric pressure outside the aircraft and an encoder, typically a rotary shaft encoder, which will provide a digital binary coded signal comprising a plurality of voltage signals in a digital code conforming to the code published in Report No. 8893–SP–1, for Federal Aviation Authority Contract FAA/BRD–329, Task No. 6 and the International Civil Aviation Organization (ICAO) International Agreements. In operation, these altitude reporting encoders 30 automatically sense the pressure altitude of the aircraft and generate a signal, comprising eleven binary bits, each bit having two possible states, corresponding to a binary "zero" or a "one," a "zero" being represented by zero volts and a "one" represented by a positive voltage.

Figure 8:
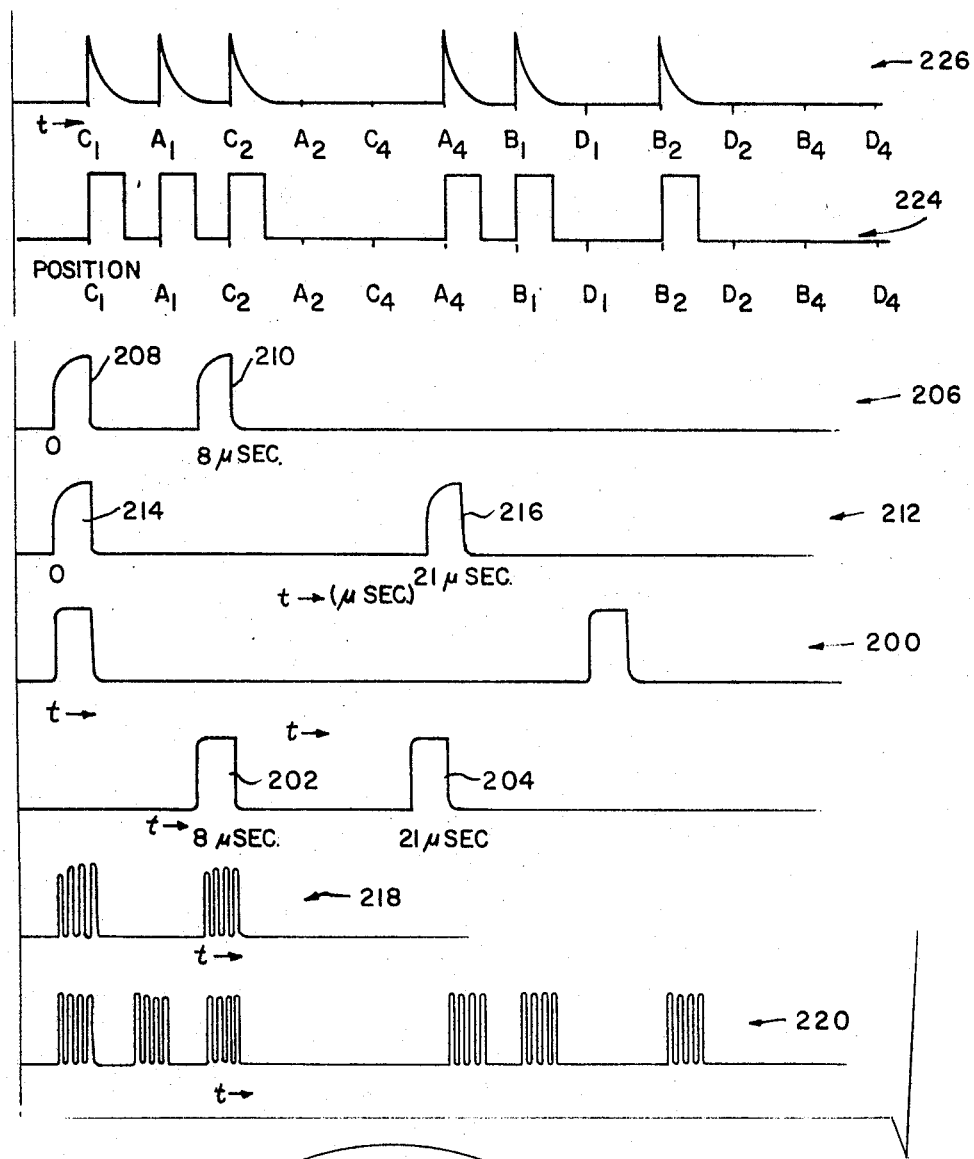
FIG. 8 depicts the various essential electrical signals which are generated within the test system.

The encoder 30 is connected to an air traffic control (ATC) transponder 32 through a multi-pin connector 31. The transponder 32, in response to an interrogating signal from a ground based transmitter, automatically processes the binary coded signal being generated by the encoder 30 and transmits the coded information back to the ground based transmitter in the form of a time-based pulse train. A typical pair of wave forms by an encoder 30 and the corresponding transponder 32 pulse train are shown in FIG. 8, as 224 and 226, respectively.

The encoder 30 further includes a second output connector 29 in parallel with connector 31 and to which is connected a decoder test set 11.

Referring now to FIG. 3, it will be seen that, illustratively, decoder test set 11 comprises a hand-operated dial 34 connected by bevel gears 35 and 36a to a shaft 36. The opposite end 37 of the shaft 36 is connected to the input shaft of a conventional mechanical counter 38. This type of counter 38 is well known being of the type which indicates the number of revolutions of the input shaft, the number of revolutions being indicated in decimal units on the display register 40.

For purposes of illustration, bevel gear 36a meshes with a bevel gear 44a mounted on a rotatable shaft 44. The shaft 44 drives directly the input shaft 47 of rotary disc encoder 46 through, for instance, a misalignment coupling 45. The input shaft 47 drives directly the 100 foot disc of encoder 46.

For a description of the type of encoder 46 I prefer to use, I refer to my aforesaid copending application Ser. No. 739,406, filed June 24, 1968, and particularly to FIGS. 18, 18a and 19 of the drawings of that application and the accompanying description.

A plurality of incandescent lamps 50 is electrically connected to output terminals 48 of encoder 46, the terminals 48 being connected to power terminal 49 through the contact strips on the encoder discs and the contact members engaging such strips, whereby each lamp 50 is illuminated when its associated contact member and contact strips are in contact. A multi-pin electrical connector 51 has a plurality of terminals 52 which are connected to the automatic encoder 30 through connector 29, each of the terminals 52 receiving a predetermined different one of the respective binary bits generated within the encoder 30.

To each of the terminals 52 is series connected a current amplifier 54. A plurality of incandescent lamps 56 is connected between the outputs of the respective amplifiers 54 and ground.

The circuitry of the amplifiers 54 is shown in FIG. 4, where it can be seen that this amplifier includes a transistor 55 and suitable biasing and load resistors 58 and 60, respectively. When a low level current signal is injected into the base 62 of the transistor 55, a current signal of sufficient amplitude to drive incandescent lamps 56 is generated through the emitter collector circuit, this current passing through a lamp 56 via lamp terminals 64. Power for activating the amplifier circuit is provided from a common positive voltage supply (not shown) which is connected to respective power supply terminals 66. The shaft encoder 46 used in my preferred automatic altitude encoder 30 and disclosed in my aforesaid copending application Ser. No. 739,406 can safely conduct more than sufficient current to illuminate lamps 56. I provide the amplifiers 54 so that my test set 11 can be used with commercially available altitude encoders that cannot carry sufficient current to illuminate lamps 56. Thus my test set 11 may include switch means (not shown) for bypassing amplifiers 54.

The aforementioned Report No. 8893–SP–1, which specifies the altitude telemetry code which my encoder 46 must produce calls for 8 pulse bits designated as $A_1$, $A_2$, $A_4$, $B_1$, $B_2$, $B_4$, $D_2$, $D_4$, all for 500-foot altitude increments and $C_1$, $C_2$, $C_4$, all for 100-foot increments of altitude. The encoder 46 and the encoder portion of the automatic altitude encoder 30 must include contact strips and contact members representing these designated bits.

Figure 5:
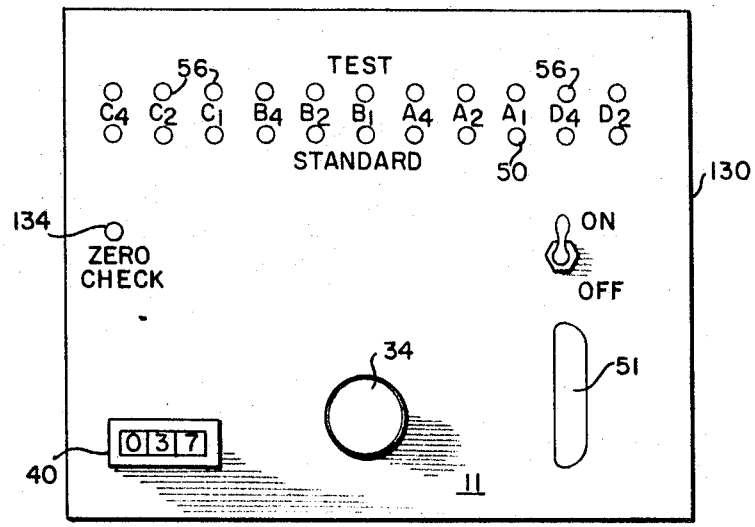
FIG. 5 is an elevational view of the decoder test set enclosure showing the relative location of the indicator lights.

I provide a contact strip portion 140 (FIG. 6) on the 100 foot disc for the encoder 46 and a contact strip portion 142 on the 500 foot disc for the encoder. A grounded light 134 is connected to the contact member 140a which engages portion 140; the portion 140 is connected to the contact member 142a which engages portion 142; and portion 142 is connected to the power source. The two portions 140, 142 are positioned, respectively, on the 100 foot and 500 foot discs so that, when these two discs are simultaneously in a position corresponding to zero altitude, the light 134 is illuminated to indicate such a condition as a reference. As shown in FIG. 5, light 134 may be on the front panel of test set 11.

Referring now to FIG. 5, it will be seen that the decoder test set 11 is enclosed within a suitable box 130. The incandescent lamps 50 and 56 are serially arranged on the upper surface of the box in two separate lines, the particular lamps representing the corresponding binary bits of the coded signals from the altitude encoder 30 and the decoder test set 11 being adjacent to each other for sight comparison.

To exercise the transponder 32, I have provided means 3 (FIG. 1) for generating the transponder interrogating signals shown in FIG. 8. Specifically, transponders used for both aircraft identification and altitude reporting are designed to respond to an identification interrogation signal 206 comprising an initiating pulse 208 and a mode pulse 210 which occurs 8 microseconds after the occurrence of the initiating pulse 208; to an altitude interrogation signal 212 comprising an initiating pulse 214 followed by a 21 microsecond delay pulse 216; or in combination, to both types of interrogation signals alternately. A detailed description of air traffic control (ATC) transponder characteristics is contained in Aeronautical Radio, Incorporated (ARINC) Characteristic No. 572, issued Sept. 3, 1968, prepared by the Airlines Electronic Engineering Committee. For purposes of explaining the operation of my present invention, it is sufficient to understand that it is necessary to provide alternately a pulse train comprising two pulses separated in time occurrence by either X microseconds or Y microseconds, where X and Y conform to ICAO timing standards, presently 8 and 21 microseconds, respectively.

The transponder interrogating system comprises a conventional variable frequency pulse generator 151, a mode interlace unit 152, and a gated, high frequency signal generator 153 for producing a pulse modulated radio signal (FIG. 1). I prefer to use a pulse generator 151 such as manufactured and sold by Hewlett Packard Corporation as Model 212A which can produce a square wave pulse of 1.5 microsecond pulse width, with a magnitude of 15 to 25 volts, at a pulse repetition rate of 350–400 Hz. pulses per second. The pulse from this pulse generator is fed through coaxial cable 155 to the mode interlace unit 152.

Figure 7:
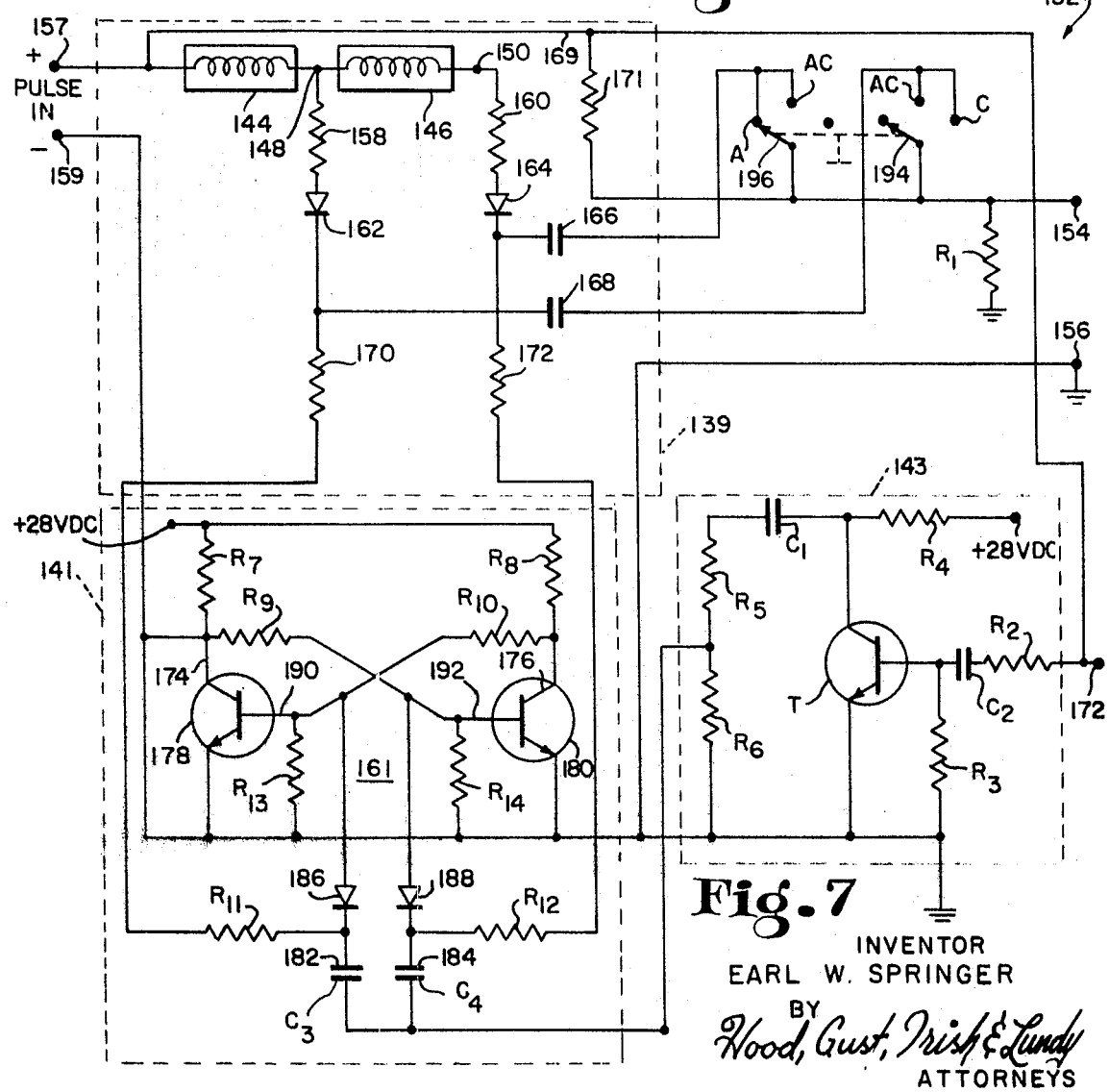
FIG. 7 is a schematic diagram of the mode interlace test set.

A circuit diagram of the mode interlace unit 152 is shown in FIG. 7 and comprises three basic circuits: a delay circuit 139, a selective grounding circuit or gating circuit 141, and a conventionally arranged pulse amplifier 143.

The delay circuit 139 is provided with suitable input terminals 157, 159 to which are applied repeating positive voltage pulses 200 (FIG. 8) from pulse generator 151. A pair of delay lines 144, 146 produces delayed pulses 202, 204 (FIG. 8) at respective delay periods of 8 microseconds and 21 microseconds. The 8 microsecond delayed pulse 202 occurring at output terminal 148 passes to output terminals 154 and 156 through series-connected resistor 158, gating diode 162, D.C. isolating capacitor 168, and a 3-position switch 194. Similarly, the 21 microsecond delayed pulse 204 occurring at terminal 150 passes to the output terminals 154, 156 through resistor 160, gating diode 164, capacitor 166 and a 3-position switch 196. Switches 194–196 are mechanically tied together as illustrated for simultaneous corresponding movement. Load resistors 170 and 172 are connected respectively to the cathodes of diodes 162 and 164.

The selective grounding unit 141 includes a steered bistable multivibrator or flip-flop 161. This type of circuit is well known in the digital switching arts and will be discussed only as it relates to the function of the mode interlace unit.

The steered flip-flop 161 provides a selective grounding circuit for the delay circuit 139. The input pulse 200 applied to input terminals 157, 159 of the delay circuit 139 is simultaneously applied through circuit means such as conductor 169 and resistor 171 to the output terminal 154. This same input pulse 200 is also simultaneously applied to the input terminal 172 of the pulse amplifier 143, where it is amplified and applied to the base of either transistor 178 or transistor 180, the application of this triggering pulse being determined by the steering circuit comprising the diodes 186, 188 and capacitors 182, 184. This triggering pulse is of negative polarity due to the inversion of the pulse amplifier circuit 143. The input pulse applied to input terminals 157 and 159 simultaneously appears at the output terminals 154, 156, and serves as the initiating pulse 208 or 214 of the respective interrogation signals 206 and 212 (FIG. 8).

The negative triggering pulse will turn on the transistor 178, 180 which was previously in an "off" state. When the transistor 178, 180 is turned "on," it provides a continuous conductive circuit for the respective time delay pulse 210 or 216 and a consequent forward bias for diode 162 or 164. The other of the two delay pulses 210, 216 will be blocked from reaching output terminals 154 by reason of the reverse bias applied to the respective diode 162, 164 by the "off" transistor collector voltage. Thus, when the delayed pulse occurs, it will be transmitted to the output terminals 154. On the next cycle, the input pulse will again appear at the output terminals, be amplified by the pulse amplifier 143, and trigger the flip-flop 161, causing it to shift into its alternate state. During this cycle, the delay pulse which appeared during the first cycle will be prevented from reaching the output terminals by the reverse bias applied to its respective gating diode 162 or 164 and the other of the delayed pulses will be transmitted to the output terminals 154 due to the forward biasing of its gating diode 162 or 164.

It will be appreciated that switches 194, 196 may be operated to select the "A" mode, "C" mode, or combined "A" and "C" mode. The terminals for switches 194, 196 have been labeled to indicate the proper mode selection and the positions respectively of the switches for such mode selection.

In order to provide a complete understanding of the operation of my mode interlace unit 152, I provide the following table showing component values and characteristics:

Resistor 158—470 ohms
Resistor 160—100 ohms
Resistor 170—82,000 ohms
Resistor 171—2,000 ohms
Resistor 172—82,000 ohms
Capacitor 166—.01 microfarad
Capacitor 168—.01 microfarad
Resistor $R_1$—22,000 ohms
Diode 162—IN648
Diode 164—IN648
Diode 186—IN648
Diode 188—IN648
Capacitor $C_1$—.01 microfarad
Capacitor $C_2$—.01 microfarad
Capacitor $C_3$—.01 microfarad
Capacitor $C_4$—.01 microfarad
Resistor $R_2$—470 ohms
Resistor $R_3$—10,000 ohms
Resistor $R_4$—33,000 ohms
Resistor $R_5$—2,200 ohms
Resistor $R_6$—2,200 ohms
Resistor $R_7$—2,200 ohms
Resistor $R_8$—2,200 ohms
Resistor $R_9$—10,000 ohms
Resistor $R_{10}$—10,000 ohms
Resistor $R_{11}$—270,000 ohms
Resistor $R_{12}$—270,000 ohms
Resistor $R_{13}$—22,000 ohms
Resistor $R_{14}$—22,000 ohms
Transistor 178—Motorola Type HEP54
Transistor 180—Motorola Type HEP54
Transistor T—Motorola Type HEP54

The output from the mode interlace unit 152 is transmitted through cable 15 to a high frequency generator 153. This signal generator 153 is commercially available and generates an output signal of 1030 megahertz. It is provided with means for receiving a modulating input signal. By applying a pulse train output from the mode interlace unit 152 to the modulating signal input terminal 163 of the high frequency signal generator 153, a pulse modulated high frequency signal 218 (FIG. 8) with a carrier frequency of 1030 megahertz, conforming to ATC characteristics for transponder interrogation signals will be generated at the output terminals 165 of the high frequency signal generator 153.

A 30 db coaxial cable 17 is connected to the output terminals 165 of the high frequency signal generator 153 and transmits this pulse modulated signal through a two-way coupler 167 to the input terminals of transponder 32. In response to this signal, the transponder will transmit a pulse modulated pulse train 220 (FIG. 8) reply signal, the particular pulse train being determined either upon the basis of the altitude encoded signal from the altitude encoder 30 or a pilot identification signal, the latter being determined by conventional control elements (sometimes called the pilot's control and indicated at 202 in FIG. 1) connected to the transponder 32. This response signal passes back through coaxial cable 19 to the two-way coupler 167.

This two-way coupler 167 may be a commercially available coupler, such as manufactured and sold by Hewlett Packard as Model 766D, designed to pass a signal from coaxial cable 17 to coaxial cable 19 and alternately to transmit a signal received on coaxial cable 19 to its other output terminal 21 while simultaneously blocking the signal from reaching the coaxial cable 17. The return signal is transmitted through the coaxial cable 23 to a 20 db load 173. Connected to the output terminal of the 20 db load 173 is a T-connector (not shown) which divides the signal between a 50 ohm dummy load 175 and a detector 177. The detector 177 demodulates the pulse modulated signal from the transponder 32 in a conventional manner and applies it to the X axis input terminals 179 of an oscilloscope 181. This scope is conventionally provided with an external sync mode whereby the scope will trace in response to reception of an input signal or pulse. It can now be seen that a visual display of the transponder output pulse train will be traced on the screen of the scope, thereby enabling the operator to verify the operation of the transponder 32 and the altitude encoder 30 combined system.

It will be appreciated that the mode interlace unit 152 is arranged to interrogate the modes combined "A" and "C" on a 1 to 1 basis rather than a 2 to 1 basis which is the present ground transmitting system interrogating basis. It is believed that a 1 to 1 basis is a better and tougher test because the "A" mode is called for each time the "C" mode is called for, and, thus, there is only one chance for the "A" mode to appear during each interrogation cycle. Any transponder that will respond to a 1 to 1 test should respond to a 2 to 1 interrogation in operation.

To operate the system and evaluate an automatic altitude encoding system with a transponder, the operator connects the standard altimeter test set 4 to the pressure sensitive means within the altitude encoder 30 with a suitable, flexible pneumatic tube 5, and makes the appropriate electrical connections from the altitude encoder 30 and transponder 32 to the decoder test set 11 and transponder interrogating signal system 3, respectively. Using the hand-operated vacuum pump 6 within the standard altimeter test set 4, a negative pressure is generated within the vacuum tank 10. Now, by manipulating manual valve 18 within the altimeter test set, a desired pressure and its corresponding altitude equivalent, read on the standard altimeter 22, can be applied to the altitude encoder 30. The decoder test set 11 is now incremented until its display register 40 indicates the same value of altitude that is indicated on the standard altimeter 22. Now the operator need merely compare the lights 50 and 56 of the respective standard and test light banks 50, 56 on the decoder test set to verify that the altitude encoder 30 is functioning properly.

To exercise the transponder 32, the variable frequency pulse generator 151, mode interlace unit 152, high frequency signal generator 153, and oscilloscope 181 are turned "on" and the mode interlace unit 152 mode selector switches 194, 196 placed in the desired position. The transponder interrogating signal 206 or 212 is now being applied to the transponder 32 and the response signal 218 or 220 from the transponder transmitted via the two-way coupler 167 to the oscilloscope 181. By observing the pulse train received at the oscilloscope 181 and comparing this pulse train with the light banks 50, 56 on the decoder test unit 11, the operator can verify the operation of the transponder 32.

Figure 9:
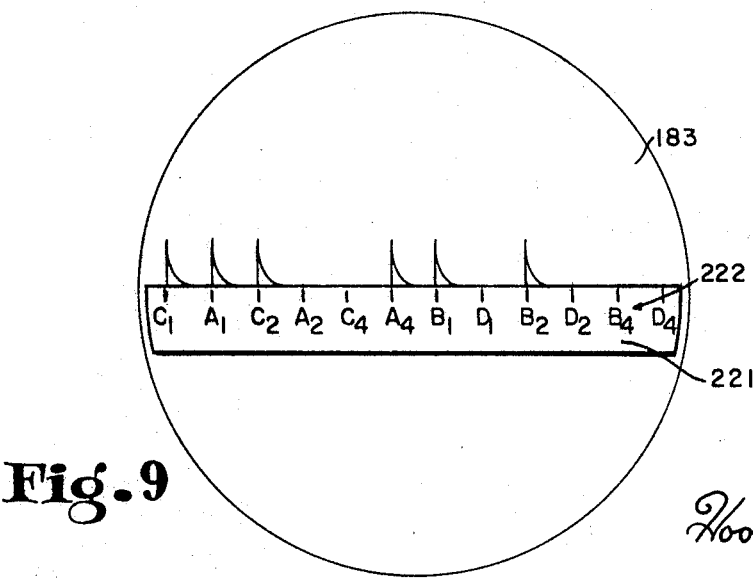
FIG. 9 is an illustration of a scale which can be affixed to the oscilloscope to facilitate interpreting the transponder transmitted signal.

The utility of the oscilloscope 181 can be further enhanced by affixing to the scope screen 183 a scale 221, as shown in FIG. 9, which scale is inscribed with marks 222 corresponding to each of the required pulse positions, each of the pulse positions being appropriately labeled in accordance with the ICAO Code. To check the encoder 30 and transponder 32 at a different altitude, the pressure applied to the encoder 30 is simply adjusted by manipulating the manual valve 18 within the standard altimeter test set 4.

To verify the alignment of the 100 foot and 500 foot discs of the encoder 46 of the decoder test set 11, the operator sets the mechanical counter 38 to read zero altitude to see if the light 134 will be illuminated. Preferably, the automatic altitude encoder 30 has a zero check feature substantially identical to that shown in FIG. 6 so that the alignment of its 100 foot and 500 foot discs can be checked at zero altitude. Additionally, the operator can close manual valve 18 and open the manual valves 20 and 24 within the altimeter test set 4 to apply ambient altitude pressure to the altitude encoder 30. (It will be appreciated that such a condition will represent local ambient conditions which, depending upon location, may or may not be at sea level.) Then, the binary value represented by the illumination of certain of the lights 56 from the altitude encoder 30 will correspond to the decimal value of the altitude at that location relative to sea level. The lights 50 can be correspondingly illuminated for comparison purposes by rotating wheel 34 to drive counter 38 to the corresponding decimal value.

In my aforesaid copending application, I disclosed means by which the pilot of an aircraft could be kept informed as to the altitude being reported to the ground by my altitude encoder 30. Such a means included a pilot's altitude readout, indicated at 200 in FIG. 1. Such a readout 200 would preferably be a decimal display means mechanically driven or electromechanically driven by the same means which drives the encoder portion of the altitude encoder 30. In the arrangement of FIG. 1, the readout 200 will provide a decimal reading corresponding to the binary reading established by the lights 56. Operation of the test arrangement of FIG. 1 will, therefore, verify the pilot's altitude readout 200 as well as the operation of the altitude encoder 30 and transponder 32.

Finally, the importance of the mode interlace unit 152 cannot be overstressed. This unit, as described in conjunction with FIG. 7, permits verification of the output of the transponder 32 in response to altitude settings established by altimeter test set 4 using the aforesaid conventional pilot's ATC control 202. This is accomplished by adjusting switches 194, 196 to select the combined "A" and "C" mode of operation and then manually setting the control 202 to correspond to each of the altitude references established by test set 4 while observing the scope 181 trace. If the output of the transponder 32, for each selected altitude, corresponds to the value manually set in the control 202, the trace for each mode will be coincident, i.e., the trace for mode "A" will be superimposed in exact registry with the trace for mode "C." The altitude settings in the pilot's control 202 may be taken from tables provided in the aforesaid report 8893–SP–1 dated May 19, 1962. The settings are made by manually adjusting switches on the control 202.

In summary, concerning the mode interlace capability, my present invention includes apparatus 3 for generating and applying interrogatig signals to a coventional air traffic control transponder 32 equipped with a conventional pilot's ATC control 202, the transponder being constructed and arranged to operate in the conventional "A" mode for interrogation and transmitting aircraft identification information and the "C" mode for interrogation and transmitting altitude information and in the combined "A" and "C" modes for interrogation and transmitting alternately both of said types of information, the ATC control 202 conventionally including mode selection switch means and altitude selection switch means. The test apparatus includes a pulse generator 151 for generating a recurring pulse, a mode interlace unit 152 connected to the pulse generator 151 to receive such recurring pulses, the mode interlace unit including circuit means for selectively providing pulse trains having pulses in predetermined time-spaced relationships corresponding, respectively, to the time-spaced relationships of the conventional interrogation modes of the transponder 32, and a high frequency signal generator 153 connected to the mode interlace unit 152 and arranged to provide a pulse modulated high frequency carrier signal in response to such pulse trains, the signal generator 153 being connected to the transponder 32 by means such as the illustrated two-way-coupler 167.

The said circuit means of the mode interlace unit 152 includes an input circuit (terminals 157, 159) for receiving such recurring pulses from the generator 151, an output circuit (terminals 154, 156), a delay circuit 139 for providing the time-spaced relationships of such pulses in such pulse trains, and means for providing a circuit connection between the input circuit and the output circuit to provide, at the output circuit, an initiating pulse each time such a recurring pulse is applied to the input circuit, such connecting means being means such as the conductor 169 and resistor 171. The said circuit means also includes switch means 194, 196 for operatively connecting the delay circuit 139 and the output circuit, the delay circuit being connected to the input circuit. The delay circuit includes first delay means 144 for providing a first time period delay after each such recurring pulse corresponding to said "A" mode time delay and second delay means 146 for providing a second time period delay after each such recurring pulse corresponding to said "C" mode time delay. The switch means 194, 196, which may be mechanically tied together as illustrated, has a first condition effective to connect the first delay means 144 to the output circuit terminals 154, 156 to provide a pulse said first time period after each initiating pulse and a second condition effective to connect the second delay means 146 to the output circuit to provide a pulse said second time period after each initiating pulse.

Finally, in order to accomplish the combined "A" and "C" mode of operation, the circuit means of the mode interlace unit 152 includes a gating circuit 141 operatively connected to the delay circuit 139 and the switch means 194, 196, the gating circuit being connected to the input circuit terminal 157 through an inverter amplifier 143 and arranged to change state each time a recurring pulse is provided to the input circuit alternately to suppress the outputs of the first and second delay means 144, 146. It will be seen that the switch means 194, 196 has a third condition effective simultaneously to connect the first and second delay means 144, 146 to the output circuit terminal 154 to provide, at the output circuit, a pulse train including alternating pairs of pulses with one pair of pulses being separated by said first time period and the other pair of pulses being separated by said second time period.

What is claimed is:

1. An apparatus for verifying the operation of an altitude reporting system of the type including an automatic altitude encoder having a pressure sensing means and encoder means for producing a first binary signal corresponding to the altitude-pressure and an air traffic control transponder for responding to interrogation signals and transmitting such first binary signal, said apparatus comprising means for generating and measuring negative pressures corresponding to selected altitudes and applying such negative pressures to such sensing means, and a decoder test set connected to said encoder means, said test set including first means for displaying such a first binary signal and second means for generating and displaying a second binary signal corresponding to such selected altitudes for comparison with such first binary signals.

2. The apparatus of claim 1 in which said second means includes a shaft encoder and means for driving said encoder to the desired setting.

3. The apparatus of claim 2 in which said second means includes a plurality of lights connected to said shaft encoder and arranged to show the condition of each bit of the second binary signal generated thereby and in which said first means includes a plurality of of lights arranged to show the condition of each bit of the first binary signal.

4. The apparatus of claim 3 including decimal register means connected to said driving means, said decimal register means being effective to display the decimal equivalent of the second binary signal generated by said shaft encoder.

5. The apparatus of claim 4 in which said decoder test set includes means for automatically displaying a signal when its said shaft encoder is set at a zero altitude position.

6. The apparatus of claim 3 in which said first means includes an amplifier for illuminating each of its said lights, each of said amplifiers having an output connected to its associated light and an input adapted to be connected to such an encoder means to amplify the bit of such a first signal corresponding to said light.

7. The apparatus of claim 1 including means for generating and applying interrogating signals to such a transponder and means for displaying the pulse output of such a transponder in response to such interrogating signals.

8. The apparatus of claim 7 in which said means for generating and applying interrogating signals includes a pulse generator for generating a recurring pulse, a mode interlace unit connected to said pulse generator to receive and process such recurring pulses, said mode interlace unit including circuit means for selectively providing pulse trains having pulses in predetermined time-spaced relationships corresponding respectively to the time-spaced relationships of the conventional interrogation modes of such a transponder, and a high frequency signal generator connected to said mode interlace unit and arranged to provide a pulse modulated high frequency carrier signal in response to such pulse trains.

9. The apparatus of claim 8 in which said circuit means includes an input circuit for receiving such recurring pulses, an output circuit, a delay circuit for providing the time-space relationships of such pulses in such pulse trains, means providing a circuit connection between said input circuit and said output circuit to provide, at said output circuit, an initiating pulse each time a pulse is applied to said input circuit, and switch means for operatively connecting said delay circuit and said output circuit, said delay circuit being connected to said input circuit, said delay circuit including first delay means for providing a time delayed pulse X microseconds after each recurring pulse and second delay means for providing a time delayed pulse Y microseconds after each recurring pulse, and said switch means having a first condition effective to connect said first delay means to said output circuit to provide a pulse X microseconds after each initiating pulse and a second condition effective to connect said second delay means to said output circuit to provide a pulse Y microseconds after each initiating pulse, where X and Y conform to ICAO timing standards, presently 8 and 21 microseconds, respectively.

10. The apparatus of claim 9 in which said circuit means further includes a gating circuit operatively connected to said delay circuit and said switch means, said gating circuit being effective alternately to suppress the outputs of said first and second delay means, and in which said switch means has a third condition effective simultaneously to connect said first and second delay means to said output circuit to provide, at said output circuit, a pulse train including alternating pairs of pulses with one pair of pulses being separated by X microseconds and the other pair of pulses being separated by Y microseconds.

11. The apparatus of claim 10 in which said gating circuit includes a bistable multivibrator connected to said input circuit and arranged to change state each time a pulse is provided to said input circuit.

12. The apparatus of claim 10 in which said gating circuit includes a steered flip-flop having a first output and a second output connected, respectively, to said first and second time delay means.

13. The apparatus of claim 10 including a diode for conducting the output of each time delay means to said switch means when said diode is forwardly biased, and in which said gating circuit includes a steered flip-flop having a first output and a second output connected, respectively, to the cathodes of said diodes, whereby, when said flip-flop is in one state, one of said diodes is reversed biased and, when said flip-flop is in its opposite state, the other of said diodes is reversed biased.

14. The apparatus of claim 13 in which said flip-flop is connected to said input circuit and arranged to change state each time a pulse is applied to said input circuit.

15. The apparatus of claim 4 including means for generating and applying interrogating signals to such a transponder and means for displaying the pulse output of such a transponder in response to such interrogating signals.

16. The apparatus of claim 15 in which said means for generating and applying interrogating signals includes a pulse generator for generating a recurring pulse, a mode interlace unit connected to said pulse generator to receive and process such recurring pulses, said mode interlace unit including circuit means for selectively providing pulse trains having pulses in predetermined time-spaced relationships corresponding respectively to the time-spaced relationships of the conventional interrogation modes of such a transponder, and a high frequency signal generator connected to said mode interlace unit and arranged to provide a pulse modulated high frequency carrier signal in response to such pulse trains.

17. The apparatus of claim 16 in which said circuit means includes an input circuit for receiving such recurring pulses, an output circuit, a delay circuit for providing the time-space relationships of such pulses in such pulse trains, means providing a circuit connection between said input circuit and said output circuit to provide, at said output circuit, an initiating pulse each time a pulse is applied to said input circuit, and switch means for operatively connecting said delay circuit and said output circuit, said delay circuit being connected to said input circuit, said delay circuit including first delay means for providing a time delayed pulse X microseconds after each recurring pulse and second delay means for providing a time delayed pulse Y microseconds after each recurring pulse, and said switch means having a first condition effective to connect said first delay means to said output circuit to provide a pulse X microseconds after each initiating pulse and a second condition effective to connect said second delay means to said output circuit to provide a pulse Y microseconds after each initiating pulse, where X and Y conform to ICAO timing standards, presently 8 and 21 microseconds, respectively.

18. The apparatus of claim 17 in which said circuit means further includes a gating circuit operatively connected to said delay circuit and said switch means, said gating circuit being effective alternately to suppress the outputs of said first and second delay means, and in which said switch means has a third condition effective simultaneously to connect said first and second delay means to said output circuit to provide, at said output circuit, a pulse train including alternating pairs of pulses with one pair of pulses being separated by X microseconds and the other pair of pulses being separated by Y microseconds.

19. The apparatus of claim 10 for verifying the output of such an altitude reporting system equipped with a conventional pilot's ATC control having mode selection switch means and altitude selection switch means for selectively providing to the transponder a binary signal corresponding to the altitude of the negative pressures selectively applied to such sensing means, and in which said means for displaying the pulse output of such a transponder includes an oscilloscope for visually displaying the output of the transponder, whereby, when the ATC control is operated to select the "A" and "C" combined mode of operation and said switch means of said interlace unit is in its said third condition and said altitude selection switch means is operated to select the altitude corresponding to the negative pressures applied to such sensing means, the alternating traces for modes "A" and "C" on said scope should be coincident.

20. An apparatus for verifying the operation of an altitude reporting system of the type including an automatic altitude encoder having a pressure sensing means and encoder means for producing a first binary signal corresponding to the altitude-pressure, an air traffic control transponder for responding to interrogation signals and transmitting such a first binary signal, and a pilot's ATC control dominating the transponder, said ATC control conventionally including mode selection switch means and altitude selection switch means, said apparatus comprising means for generating and measuring negative pressures corresponding to selected altitudes and applying such negative pressures to such sensing means, means for generating and applying interrogating signals to such a transponder, the last-said means including a pulse generator for generating a recurring pulse, a mode interlace unit connected to said pulse generator to receive and process such recurring pulses, said mode interlace unit including circuit means for selectively providing pulse trains having pulses in predetermined time-spaced relationships corresponding respectively to the time-spaced relationships of the conventional interrogation modes of such a transponder, a high frequency signal generator connected to said mode interlace unit and arranged to provide a pulse modulated high frequency carrier signal in response to such pulse trains, and means for displaying the pulse output of such a transponder in response to such interrogating signals.

21. The apparatus of claim 20 in which said circuit means includes an input circuit for receiving such recurring pulses, an output circuit, a delay circuit for providing the time-space relationships of such pulses in such pulse trains, means providing a circuit connection between said input circuit and said output circuit to provide, at said output circuit an initiating pulse each time a pulse is applied to said input circuit, and switch means for operatively connecting said delay circuit and said output circuit, said delay circuit being connected to said input circuit, said delay circuit including first delay means for providing a time delayed pulse X microseconds after each recurring pulse and second delay means for providing a time delayed pulse Y microseconds after each recurring pulse, and said switch means having a first condition effective to connect said first delay means to said output circuit to provide a pulse X microseconds after each initiating pulse and a second condition effective to connect said second delay means to said output circuit to provide a pulse Y microseconds after each initiating pulse, where X and Y conform to the ICAO timing standards.

22. The apparatus of claim 21 in which said circuit means further includes a gating circuit operatively connected to said delay circuit and said switch means, said gating circuit being effective alternately to suppress the outputs of said first and second delay means, and in which said switch means has a third condition effective simultaneously to connect said first and second delay means to said output circuit to provide, at said output circuit, a pulse train including alternating pairs of pulses with one pair of pulses being separated by X microseconds and the other pair of pulses being separated by Y microseconds.

23. The apparatus of claim 22 including a diode for conducting the output of each time delay means to said switch means when said diode is forwardly biased, and in which said gating circuit includes a steered flip-flop having a first output and a second output connected, respectively, to the cathodes of said diodes, whereby, when said flip-flop is in one state, one of said diodes is reversed biased and, when said flip-flop is in its opposite state, the other of said diodes is reversed biased.

References Cited

UNITED STATES PATENTS 3,104,540  9/1963  Vitale _____ 73—4 R

DONALD O. WOODIEL, Primary Examiner

U.S. Cl. X.R.

73—384